United States Patent
Charvet et al.

(10) Patent No.: US 11,874,432 B2
(45) Date of Patent: Jan. 16, 2024

(54) SPACE OPTICAL INSTRUMENT COMPRISING AN IMPROVED THERMAL GUARD

(71) Applicant: AIRBUS DEFENCE AND SPACE SAS, Toulouse (FR)

(72) Inventors: Didier Charvet, Toulouse (FR); Sébastien Le Foll, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/908,431

(22) PCT Filed: Mar. 1, 2021

(86) PCT No.: PCT/FR2021/050343
§ 371 (c)(1),
(2) Date: Aug. 31, 2022

(87) PCT Pub. No.: WO2021/176169
PCT Pub. Date: Sep. 10, 2021

(65) Prior Publication Data
US 2023/0119679 A1    Apr. 20, 2023

(30) Foreign Application Priority Data

Mar. 2, 2020   (FR) ...................... 20 02084

(51) Int. Cl.
*G02B 7/02*   (2021.01)
*G02B 23/00*   (2006.01)
(Continued)

(52) U.S. Cl.
CPC ............ *G02B 7/181* (2013.01); *G02B 23/02* (2013.01); *G02B 23/16* (2013.01); *G05D 23/1932* (2013.01)

(58) Field of Classification Search
CPC . G02B 7/00; G02B 7/008; G02B 7/18; G02B 7/181; G02B 7/1815; G02B 7/182;
(Continued)

(56) References Cited

U.S. PATENT DOCUMENTS 7,855,832 B2 * 12/2010 Chanal ................... G02B 7/181
                                              359/399
8,848,290 B2 *  9/2014 Hull ........................ G02B 23/16
                                              359/399
(Continued)

FOREIGN PATENT DOCUMENTS

CN      110376701 A   * 10/2019
EP      1 492 396     *  2/2004
(Continued)

OTHER PUBLICATIONS

French International Search Report with English Translation for PCT/FR2021/050343, dated Jun. 7, 2021, 6 pages.
(Continued)

*Primary Examiner* — Thong Q Nguyen
(74) *Attorney, Agent, or Firm* — Nixon & Vanderhye P.C.

(57) ABSTRACT

A space optical instrument is disclosed including a primary mirror having an optical axis and including a first face, referred to as the front face, oriented towards an observed area, and a second face opposite to the first, referred to as the rear face, the optical instrument further including a thermal stabilization device for the primary mirror, comprising a thermally conductive wall extending around the optical axis (O) on the front face side of the primary mirror towards which this face is oriented. The thermal stabilization device further includes a temperature regulating device for the circumferential wall that is capable of using the measurement of an incident heat flux on the mirror, and adapting the temperature of the circumferential wall according to the
(Continued)

measured incident heat flux, in order to keep the front face of the mirror at a constant temperature.

11 Claims, 2 Drawing Sheets

(51) Int. Cl.
*G02B 7/18* (2021.01)
*G02B 23/02* (2006.01)
*G02B 23/16* (2006.01)
*G05D 23/19* (2006.01)

(58) Field of Classification Search
CPC ........ G02B 7/195; G02B 23/00; G02B 23/16; G02B 23/2476; G02B 23/2492
USPC ........ 359/395, 399–406, 507–512, 820, 843, 359/845, 878
See application file for complete search history.

(56) References Cited

U.S. PATENT DOCUMENTS

2002/0186479 A1* 12/2002 Schoppach ............ G02B 7/028
359/819
2003/0231415 A1 12/2003 Puerto

FOREIGN PATENT DOCUMENTS

| EP | 2 161 605 | 3/2010 |
| FR | 2 894 037 | 6/2007 |
| JP | H09-133872 | 5/1997 |
| KR | 10-2012-0072586 | 7/2012 |
| WO | 2007/060376 | 5/2007 |

OTHER PUBLICATIONS

French Written Opinion of the ISA for PCT/FR2021/050343, dated Jun. 7, 2021, 6 pages.
French International Preliminary Report on Patentability for PCT/FR2021/050343, dated Jun. 14, 2022, 10 pages.

* cited by examiner though the wall of high thermal inertia is formed of aluminum approximately 1 mm thick. This thermal inertia allows dampening variations in the incident heat flux and reducing temperature fluctuations of the mirror.

A disadvantage of this type of thermal stabilizer is firstly its mass, since high thermal inertia implies a significant thickness of the material and therefore a significant onboard mass for the satellite.

Another disadvantage is that, although such thermal protection reduces temperature fluctuations of the mirror over long periods of time (seasonal variations, day/night alternation), the high thermal inertia of the circumferential wall does not allow adapting to rapid variations in heat flux, such as the example described above where cloud cover passes over the observed area, or during a change in tilt which can significantly modify the observed scene and the associated thermal environment in a few tens of seconds.

SPACE OPTICAL INSTRUMENT COMPRISING AN IMPROVED THERMAL GUARD

CROSS REFERENCE TO RELATED APPLICATIONS

The present application is a National Phase of International Application Number PCT/FR2021/050343 filed Mar. 1, 2021, which designated the U.S. and claims priority benefits from French Application Number FR20 02084 filed Mar. 2, 2020, the entire contents of each of which are hereby incorporated by reference.

TECHNICAL FIELD

This application relates to a space optical instrument comprising a primary mirror and a thermal stabilization device, also referred to as a thermal guard, for this primary mirror.

PRIOR ART

Observation satellites comprise high-precision optical instruments, including in particular a primary mirror forming the main objective of the optical instrument. The focal length of the primary mirror is defined by the geometry of the mirror, and must remain constant throughout the use of the optical instrument in order to guarantee a satisfactory level of sharpness for the duration of the mission.

However, regardless of the material used for its manufacture, a mirror unavoidably undergoes mechanical deformation under the effect of variations in its thermal environment, which causes variations in the average temperature of the mirror, radial temperature gradients linked to temperature gradients in the external environment, or axial temperature gradients linked to temperature gradients between the front and rear environments of the mirror.

In addition, a space optical instrument is subject to strong variations in incident heat flux on the primary mirror, for example according to the season or the time of day (day or night) and the area observed due to the satellite's agility (ability to observe not only in the nadir direction, but also beyond the satellite's ground track by modifications in the satellite's roll and pitch attitude along its orbit). In some cases, the heat flux variations can be very fast, since a cloud passing over the observed area can have a greater albedo than the area itself and thus increase the incident heat flux on the primary mirror within a few seconds, and for a short duration.

To avoid deformations of the mirror, it is known to achieve thermal stabilization of the mirror by positioning a thermal stabilization device around it. The thermal stabilization device comprises in particular a wall of high thermal inertia, designed to dampen temperature variations at the front face of the mirror. This is the case, for example, of the protection device described in document EP 1 955 100, in which the wall of high thermal inertia is formed of aluminum approximately 1 mm thick. This thermal inertia allows dampening variations in the incident heat flux and reducing temperature fluctuations of the mirror.

SUMMARY

There is therefore a need to improve the situation.

In particular, the invention aims to propose thermal stabilization for a primary mirror which allows a more reactive and more precise regulation of the temperature of the mirror, and having a reduced mass.

In this respect, the invention proposes a space optical instrument comprising a primary mirror having an optical axis and comprising a first face, referred to as the front face, oriented towards an observed area, and a second face opposite to the first, referred to as the rear face, the optical instrument further comprising a thermal stabilization device for the primary mirror, comprising a thermally conductive wall extending around the optical axis on the front face side of the primary mirror towards which this face is oriented, characterized in that the thermal stabilization device further comprises a temperature regulating device for the thermally conductive wall, capable of using the measurement of an incident heat flux on the mirror and varying the temperature of said wall according to the measured incident heat flux, in order to keep the front face of the mirror at a constant temperature.

In some embodiments, in which the thermally conductive wall is adapted to have a ratio $\lambda/C_p$, where $\lambda$ is the thermal conductivity and $C_p$ the thermal capacity, of between 0.5 and 2 kg/m/s at 20° C.

In some embodiments, the thermally conductive wall is formed of pyrolytic carbon encapsulated in polyimide.

The thermally conductive wall may be cylindrical, having a circular cross-section centered on the optical axis.

The wall may have a face oriented towards the optical axis of the primary mirror and an opposite face, and the face oriented towards the optical axis is capable of presenting an emissivity within the infrared range of radiation that is greater than 0.9.

In some embodiments, the face of the wall oriented towards the optical axis is of black polyimide.

In some embodiments, the wall comprises a thermally insulating coating on its face opposite to the face oriented towards the optical axis.

In some embodiments, the wall is capable of exhibiting a thermal conductivity which decreases with distance from the primary mirror.

In some embodiments, the regulating device comprises a set of heating devices for the thermally conductive wall, a heat flux sensor on the front face of the mirror, and a controller capable of controlling the heating devices according to the heat flux measured by the sensor.

In one embodiment, the heat flux sensor comprises a thermistor and a support part that is arranged to receive a heat flux representative of the heat flux received by the primary mirror, and the thermistor is capable of measuring the temperature of the support part.

In some embodiments, the primary mirror may comprise a through-hole on which a diaphragm is mounted, and the heat flux sensor is mounted on the diaphragm. In this case, the temperature regulating device for the thermally conductive wall may be capable of varying the temperature of said wall according to the temperature of the support part measured by the thermistor, so as to keep the support part at a constant temperature.

The controller may be of the proportional-integral type.

The thermal protection device may further comprise a heating device for the rear face of the mirror, capable of ensuring a constant heating of the rear face.

The proposed space optical instrument comprises a lighter and more efficient thermal stabilization device than the prior art, because the stabilization wall has low thermal inertia, such that, by controlling the heating of this wall in real time according to the variations in incident flux on the primary mirror, it is possible to keep the primary mirror at a constant temperature and at the very least to reduce its variations, and to reduce the temperature gradients in the mirror.

The low thermal inertia of the wall also allows it to be significantly lighter compared to walls with high thermal inertia, for example made of aluminum, of the prior art.

BRIEF DESCRIPTION OF DRAWINGS

Other features, details, and advantages will become apparent upon reading the detailed description below, and upon analyzing the appended drawings, in which.

DESCRIPTION OF EMBODIMENTS

Figure 1:
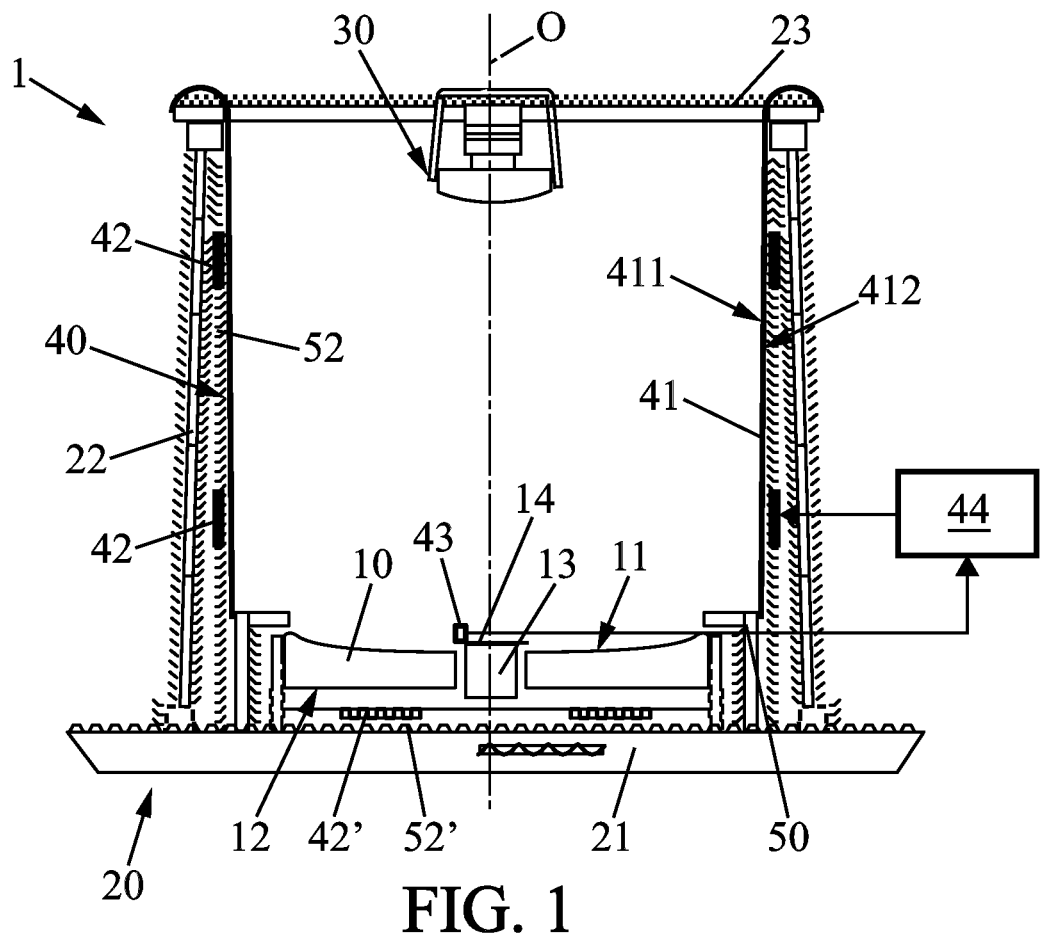
FIG. 1 schematically represents an example of a space optical instrument.
Figure 2:
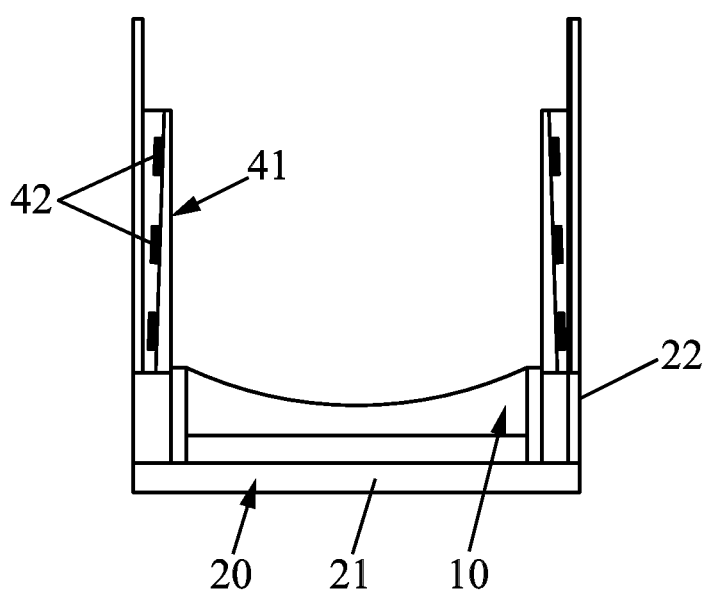
FIG. 2 schematically represents an example of a wall of a thermal stabilization device.

Reference is now made to FIG. 1, which schematically represents an example of a space optical instrument 1. This instrument may be for example a telescope mounted on board a satellite. The instrument 1 comprises a primary mirror 10 comprising an optical axis O and mounted on the instrument 1 by means of a support structure 20.

The support structure 20 comprises a bottom wall 21 and side walls 22 defining a cavity in which the primary mirror is positioned at the bottom. The support structure may also comprise an upper portion 23, opposite to the bottom wall 21, which makes it possible to stiffen the support structure and optionally to support other devices such as a secondary mirror described below.

The primary mirror 10 is a major element of the optical instrument 1 which cannot escape the influence of the variable thermal environment of the observed scene. It comprises a first face 11, referred to as the front face, which is oriented towards an observed area, and can therefore be subjected to significant and rapid variations in heat flux. The primary mirror 10 also comprises a second face 12, opposite to the first, referred to as the rear face. The material forming the mirror may be for example aluminum, silicon carbide SiC, beryllium, glass ceramic known under the trade name Zerodur, or special glass referred to as ULE (Ultra Low Expansion) glass. The size of the primary mirror is arbitrary.

The optical instrument may also comprise a secondary mirror 30 positioned so that the primary mirror reflects light rays entering the optical instrument along the optical axis of the primary mirror, towards the secondary mirror. In one embodiment, the optical instrument 1 may be a Cassegrain or Korsch type telescope. The primary mirror 10 comprises a through-hole 13 placed at the center of the primary mirror or slightly offset from the center, and the secondary mirror is positioned facing the primary mirror such that the rays reflected by the primary mirror onto the secondary mirror are again reflected by the latter towards the primary mirror 10 where they pass through the through-hole 13, to then be conveyed by any other optical devices (in the case of a Korsch type telescope: a third mirror) towards a detection system (not shown) of the optical instrument.

The optical instrument 1 also comprises a thermal stabilization device 40 for the primary mirror 10. This comprises a thermally conductive wall 41, substantially cylindrical around the optical axis O of the primary mirror, and extending from the front face side of the mirror towards which this face is oriented. The wall 41 is advantageously of circular cross-section centered on axis O. "Substantially cylindrical" means that the wall 41 may be strictly cylindrical or slightly flared, depending on the geometry of the cavity in which the primary mirror 10 is placed. The wall 41 preferably extends from the front face of the mirror or from an annular structure 50 extending around the primary mirror 10 and forming a diaphragm peripheral thereto. In addition, the wall 41 extends for a length less than or equal to the length of the side walls 22 of the support structure 20, so as to be contained within the cavity. In one embodiment, the wall 41 may be mounted on the side walls 22. Additionally or alternatively, the wall 41 may also be mounted, at its base, on the annular structure 50 forming a diaphragm. Additionally or alternatively, it may also extend along the entire length of the side walls 22 of the support structure and be fixed, at its end opposite to the primary mirror, to the upper portion 23 of this support structure.

The thermal stabilization device 40 further comprises a temperature regulating device for the thermally conductive wall 41, capable of measuring an incident heat flux on the primary mirror and of heating the wall 41 by adapting the temperature of the wall 41 according to the measured incident heat flux, such that the temperature of the wall 41 makes it possible to keep the front face of the mirror at a constant temperature. Thus, the temperature regulating device for the wall 41 modifies the temperature of the wall according to the incident heat flux on the mirror, such that the temperature at the front face of the mirror is constant. For example, if the exposure of the optical instrument causes a decrease in the incident heat flux on the mirror, the temperature regulating device is capable of raising the temperature of the thermally conductive wall 41 in order to compensate for the drop in heat flux and to keep the front face of the mirror at a constant temperature.

To do so, the thermal regulating device advantageously comprises a set of heating devices 42 for the wall 41. These heating devices are advantageously distributed regularly on the wall 41 so as to ensure its uniform heating. In one embodiment, the heating devices 42 may for example be attached to the wall and be capable of heating the wall by Joule effect. In one embodiment, the heating devices may be formed by copper wires embedded in polyimide tape, known by the trade name Kapton. The wall 41 comprising an inner face 411 oriented towards the optical axis and an outer face 412 opposite to the inner face, the heating devices are attached to the outer face of the wall. In addition, so that the heating provided by these heating devices does not interfere with the operation of other equipment of the satellite, or of other components of the optical instrument, the outer face of the cylindrical wall as well as the heating devices are advantageously covered with an insulating coating 52, for example a multilayer thermal insulation (also referred to by the acronym MLI for Multi Layer Insulation).

Controlling the intensity of the electric current applied to the heating devices 42, by a current source (not shown), makes it possible to control their temperature and therefore that of the wall.

In addition, the wall 41 advantageously has very low thermal inertia, in order to be able to react quickly to temperature variations of the heating devices, and high thermal conductivity, so that the entirety of the wall has a homogeneous temperature and thereby ensures a uniform temperature within the cavity in which the primary mirror is located at the bottom.

The thermal inertia of the wall increases with the mass of the wall, and therefore with its thickness, and with the thermal capacity of the material forming the wall. In fact, the thickness of the wall is advantageously less than 1 mm, for example less than 0.5 mm, for example between 25 and 150 µm. Given this reduced thickness, the wall can be flexible, its mechanical strength being provided by the support structure 20.

Furthermore, the thermally conductive wall 41 is advantageously adapted to have a thermal capacity that is as low as possible and a thermal conductivity that is as high as possible. In this respect, the wall 41 is adapted to have a ratio $\lambda/C_p$, where $\lambda$ is the thermal conductivity and $C_p$ is the thermal capacity, of between 0.5 and 2 kg/m/s at 20° C., and more advantageously between 1.1 and 2 kg/m/s at 20° C. In one embodiment, the wall is formed from a single material, and the above values apply to the $\lambda/C_p$ ratio of the material. Alternatively, the wall is an assembly of several materials, and the above values apply to an equivalent ratio for the wall.

Finally, the wall 41 must be resistant to solar illumination, since it is possible for the optical instrument to briefly be oriented so that it receives light rays from the sun, either concentrated by reflection on the primary mirror only or concentrated by a double reflection on the primary mirror then on the secondary mirror. In consideration of this possible exposure to concentrated solar rays, the wall 41 must withstand a concentration of incident solar flux of at least 100 kW/m$^2$, preferably at least 150 kW/m$^2$, and more advantageously at least than 200 kW/m$^2$.

In one embodiment, these properties in terms of thermal conductivity and thermal capacity and resistance to solar illumination are obtained with a wall comprising pyrolytic carbon. In one embodiment, the wall may comprise pyrolytic carbon encapsulated in polyimide or kapton, for example between two polyimide films, in order to avoid contamination from pyrolytic carbon on the primary mirror, and to meet particulate cleanliness standards applicable to space optical instruments.

If the optical instrument is a Cassegrain or Korsch type telescope, the configuration of the primary mirror implies that in the event of solar illumination, the light rays not parallel to the optical axis and incident on the cylindrical wall will be proportionally more numerous towards the end of the cylindrical wall located closest to the primary mirror. In one embodiment, the cylindrical wall may therefore have higher thermal conductivity towards the primary mirror, in other words maximal at its end closest to the primary mirror, and decreasing with the distance from the primary mirror.

To achieve this, the cylindrical wall may have a variable thickness along the optical axis O of the primary mirror, the thickness being greater at the end of the wall located closest to the primary mirror, enabling the cylindrical wall to comprise a greater amount of pyrolytic carbon close to the mirror, and therefore to have greater thermal conductivity. Advantageously, the inner face 411 of the wall 41 may be black in color, either by being painted black or by using a black material, for example black kapton. This allows the wall to have high absorptivity within the visible range, and high thermal emissivity within the infrared range (for example greater than 0.9 in the case of black kapton). In addition, the inner face being black in color reduces stray light within the visible range and provides better thermal coupling with the mirror, allowing better control of the regulation system.

For regulating the temperature of the wall, the regulating device further comprises a heat flux sensor 43 on the primary mirror. This sensor 43 may be capable of directly measuring the thermal power that it receives. Alternatively, the sensor 43 may comprise a thermistor and a support part (not shown) receiving a heat flux representative of the heat flux received by the mirror, the thermistor measuring the temperature of the support part in order to deduce the heat flux received by the mirror. For example, this support part may be mounted on the mirror, or, preferably, on an element close to the mirror while being thermally decoupled from this element. This support part has very low thermal inertia, for better sensor reactivity. For example, in the case of a Cassegrain type telescope, a diaphragm 14 is mounted on the through-hole, and the heat flux sensor may advantageously be mounted on the diaphragm.

Finally, the regulating device also comprises a controller 44, capable of receiving the data measured by the heat flux sensor 43, and of controlling the heating devices 42 (for example by controlling a current generator) so as to keep constant the heat flux measured by the sensor, and therefore the temperature of the front face of the mirror. Alternatively, in the case where the sensor 43 comprises a thermistor and a support part, the regulation may be implemented so as to keep the support part of the sensor 43 at a constant temperature. The controller 44 may be of the proportional-integral (PI) type or of the proportional integral derivative (PID) type.

Figure 3:
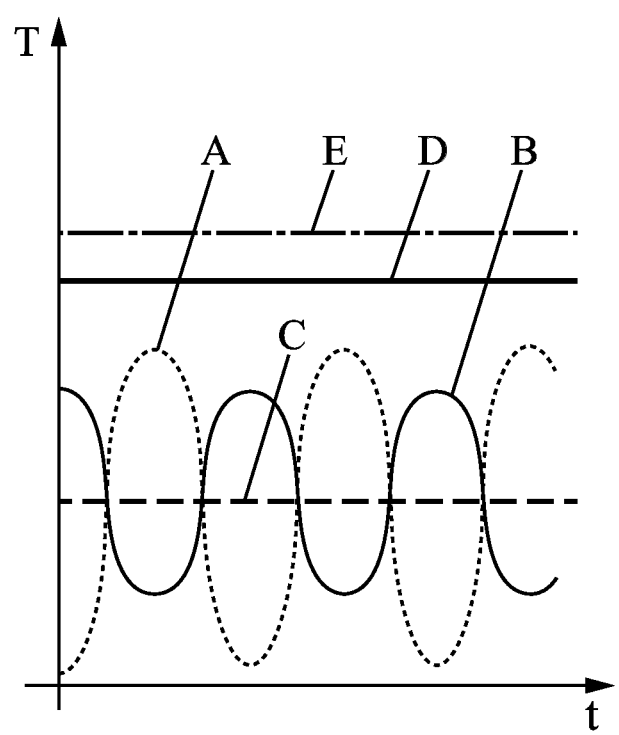
FIG. 3 schematically represents the thermal regulation of the primary mirror, implemented in the space optical instrument.

Referring to FIG. 3, the thermal regulation implemented by the thermal regulating device is thus schematically represented. Curve A represents the temperature of the environment of the front face of the primary mirror in the absence of thermal regulation. Curve B represents the controlled temperature of the wall 41, and curve C represents the temperature of the environment of the front face of the mirror resulting from curve A and curve B, which can be seen to be constant.

In addition, the thermal protection device for the mirror may also comprise heating devices 42' arranged close to the rear face of the mirror so as to heat this face, the heating devices being controlled—for example by the controller 44—to provide constant heating of the rear face of the mirror. As above for the heating devices for the cylindrical wall 41, those ensuring the heating of the rear face of the mirror may be covered with an insulating coating 52' of the MLI type. Returning to FIG. 3, this constant heating on the rear face of the mirror is represented by curve E, and the average temperature of the mirror is represented by curve D. The constant heating of the rear face of the mirror makes it possible to keep this face at a constant temperature due to the insulating coating and the reduced exposure of this face to variations in heat flux.

The invention claimed is:

1. A space optical instrument comprising a primary mirror having an optical axis and comprising a front face oriented towards an observed area, and a rear face opposite to the front face, the optical instrument further comprising:

a thermally conductive wall extending around the optical axis on a side of the primary mirror towards which the front face is oriented,
wherein the thermally conductive wall is cylindrical,
a set of heaters disposed on the cylindrical thermally conductive wall,
a heat flux sensor configured for measuring an incident heat flux on the front face of the primary mirror,
wherein the heat flux sensor comprises a thermistor and a support part that is arranged to receive a heat flux representative of the heat flux received by the primary mirror, and the thermistor is capable of measuring a temperature of the support part,
wherein the primary mirror comprises a through-hole on which a diaphragm is mounted, and the heat flux sensor is mounted on the diaphragm, and
a controller, configured for receiving a measurement of an incident heat flux on the primary mirror acquired by the heat flux sensor, and to control the heaters to vary a temperature of the thermally conductive wall according to the measured incident heat flux,
in order to keep the front face of the primary mirror at a constant temperature.

2. The space optical instrument according to claim 1, wherein the thermally conductive wall is adapted to have a ratio $\lambda/C_p$, where $\lambda$ is a thermal conductivity and $C_p$ is a thermal capacity, of between 0.5 and 2 kg/m/s at 20° C.

3. The space optical instrument according to claim 1, wherein the thermally conductive wall is formed of pyrolytic carbon encapsulated in polyimide.

4. The space optical instrument according to claim 1, wherein the wall has a face oriented towards the optical axis of the primary mirror and an opposite face, and the face oriented towards the optical axis is capable of presenting an emissivity within a range of infrared radiation that is greater than 0.9.

5. The space optical instrument according to claim 4, wherein the wall comprises a thermally insulating coating on the face opposite to the face oriented towards the optical axis.

6. The space optical instrument according to claim 1, wherein the thermally conductive wall has a face oriented towards the optical axis, the face being of black polyimide.

7. The space optical instrument according to claim 1, wherein the wall is capable of exhibiting a thermal conductivity which decreases with distance from the primary mirror.

8. The space optical instrument according to claim 7, wherein the controller is a proportional-integral controller.

9. The space optical instrument according to claim 1, wherein the controller is configured to control the set of heaters to vary the temperature of the thermally conductive wall according to the temperature of the support part measured by the thermistor, so as to keep the support part at a constant temperature.

10. The space optical instrument according to claim 1, further comprising a heater on the rear face of the primary mirror, capable of ensuring a constant heating of the rear face.

11. A space optical instrument comprising a primary mirror having an optical axis and comprising a front face oriented towards an observed area, and a rear face opposite to the front face,
the optical instrument further comprising:
a thermally conductive wall extending around the optical axis on a side of the primary mirror towards which the front face is oriented,
a set of heaters for heating the thermally conduct wall,
a heat flux sensor configured for measuring an incident heat flux on the front face of the mirror,
wherein the primary mirror comprises a through-hole on which a diaphragm is mounted, and the heat flux sensor is mounted on the diaphragm, and
a controller, configured for receiving a measurement of an incident heat flux on the mirror acquired by the heat flux sensor, and to control the heaters to vary a temperature of the thermally conductive wall according to the measured incident heat flux, in order to keep the front face of the mirror at a constant temperature.

* * * * *